(12) United States Patent
Chikazawa et al.

(10) Patent No.: US 8,905,015 B2
(45) Date of Patent: Dec. 9, 2014

(54) PULSE BURNER AND LIQUID HEATING COOKER

(75) Inventors: Hideo Chikazawa, Nagoya (JP);
Tsuneyasu Hayakawa, Nagoya (JP);
Hideki Kijimoto, Nagoya (JP)

(73) Assignee: Paloma Co., Ltd., Nagoya (JP)

( * ) Notice: Subject to any disclaimer, the term of this patent is extended or adjusted under 35 U.S.C. 154(b) by 1243 days.

(21) Appl. No.: 12/208,055

(22) Filed: Sep. 10, 2008

(65) Prior Publication Data

US 2009/0090352 A1 Apr. 9, 2009

(30) Foreign Application Priority Data

Oct. 5, 2007 (JP) ................................. 2007-262487

(51) Int. Cl.
| | | |
|---|---|---|
| *A47J 27/026* | (2006.01) | |
| *F23C 3/00* | (2006.01) | |
| *F23C 15/00* | (2006.01) | |
| *A47J 37/12* | (2006.01) | |
| *A47J 27/02* | (2006.01) | |

(52) U.S. Cl.
CPC ............. *A47J 37/1252* (2013.01); *F23C 3/004* (2013.01); *F23C 3/002* (2013.01); *F23C 15/00* (2013.01)
USPC .................. 126/391.1; 126/376.1; 126/373.1; 99/403; 99/359

(58) Field of Classification Search
CPC ... A47J 37/1247; A47J 37/12; A47J 37/1242; A47J 27/026; A47J 36/38; F24H 1/0054; F23C 3/004
USPC ............ 126/391.1, 376.1, 373.1; 99/403, 359
IPC .................................. A47J 27/026,27/02, 37/12
See application file for complete search history.

(56) References Cited

U.S. PATENT DOCUMENTS

| 77,734 A | * | 5/1868 | Howard | ...................... 126/391.1 |
| 178,751 A | * | 6/1876 | Ezard | .............................. 237/57 |

(Continued)

FOREIGN PATENT DOCUMENTS

| EP | 1186269 A1 | * | 3/2002 | .............. A47J 37/12 |
| EP | 1188402 A1 | * | 3/2002 | .............. A47J 37/12 |

(Continued)

OTHER PUBLICATIONS

May 23, 2012 Search Report issued in European Patent Application No. 08016901.4.

(Continued)

*Primary Examiner* — Kang Hu
*Assistant Examiner* — Daniel E Namay
(74) *Attorney, Agent, or Firm* — Oliff PLC

(57) ABSTRACT

A pulse burner includes: a combustion chamber provided in a liquid vat capable of storing liquid; a tail pipe that is connected to the combustion chamber and has a heat exchanging portion located in the liquid vat and bent in a predetermined shape; and a mixing chamber which communicates with the combustion chamber and to which fuel gas and combustion air is allowed to be supplied. When mixed gas including the fuel gas and the combustion gas is exploded and combusted, the combustion exhaust gas is exhausted through the tail pipe to allow heat exchange with the liquid, and the mixed gas is inhaled from the mixing chamber into the combustion chamber. At least the heat exchanging portion of the tail pipe is bent on a substantially horizontal plane.

8 Claims, 3 Drawing Sheets

(56) References Cited

U.S. PATENT DOCUMENTS

| | | | | |
|---|---|---|---|---|
| 793,472 | A * | 6/1905 | Thorbus | 126/391.1 |
| 1,289,842 | A * | 12/1918 | McClees | 126/391.1 |
| 1,912,288 | A * | 5/1933 | Lundt et al. | 432/209 |
| 1,994,555 | A * | 3/1935 | Wilson | 99/408 |
| 2,124,186 | A * | 7/1938 | Childs | 99/408 |
| 2,429,360 | A * | 10/1947 | Kells | 126/391.1 |
| 3,267,993 | A * | 8/1966 | Fennell | 126/374.1 |
| 3,851,625 | A * | 12/1974 | Holt | 122/136 R |
| 4,599,990 | A * | 7/1986 | Fritzsche et al. | 126/374.1 |
| 4,628,903 | A * | 12/1986 | Farnsworth et al. | 126/374.1 |
| 4,947,824 | A * | 8/1990 | Ejiri et al. | 126/391.1 |
| 4,949,703 | A * | 8/1990 | Ejiri et al. | 126/391.1 |
| 4,955,324 | A | 9/1990 | Ejiri | |
| 5,038,753 | A * | 8/1991 | Yokoyama et al. | 126/391.1 |
| 5,261,322 | A * | 11/1993 | Yokoyama et al. | 99/330 |
| 5,380,191 | A * | 1/1995 | Itakura et al. | 431/1 |
| 5,819,638 | A * | 10/1998 | Yokoyama | 99/330 |
| 5,901,641 | A * | 5/1999 | McNamara | 99/403 |
| 6,095,037 | A | 8/2000 | Savage et al. | |
| 6,269,808 | B1 * | 8/2001 | Murahashi | 126/391.1 |
| 6,345,571 | B2 * | 2/2002 | Tateyama | 99/330 |
| 6,367,372 | B1 * | 4/2002 | Chikazawa et al. | 99/403 |
| 6,371,010 | B1 * | 4/2002 | Chikazawa et al. | 99/344 |
| 6,374,821 | B1 * | 4/2002 | Furuhashi | 126/376.1 |
| 6,443,051 | B1 | 9/2002 | Suzuki | |
| 6,470,794 | B2 * | 10/2002 | Takahashi | 99/408 |
| 6,930,290 | B2 * | 8/2005 | Kijimoto et al. | 219/506 |
| 7,856,923 | B2 * | 12/2010 | Hayakawa et al. | 99/403 |
| 8,069,777 | B2 * | 12/2011 | Chikazawa et al. | 99/403 |
| 2001/0054357 | A1 * | 12/2001 | Tateyama | 99/330 |
| 2002/0002911 | A1 * | 1/2002 | Tateyama | 99/330 |
| 2002/0005121 | A1 * | 1/2002 | Suzuki | 99/403 |
| 2002/0026875 | A1 * | 3/2002 | Chikazawa et al. | 99/403 |
| 2002/0038604 | A1 * | 4/2002 | Chikazawa et al. | 99/330 |
| 2002/0046657 | A1 * | 4/2002 | Takahashi | 99/330 |
| 2002/0096170 | A1 * | 7/2002 | Takahashi | 126/391.1 |
| 2002/0104445 | A1 | 8/2002 | Suzuki | |
| 2008/0250938 | A1 * | 10/2008 | Kijimoto | 99/403 |
| 2009/0007799 | A1 * | 1/2009 | Hayakawa et al. | 99/403 |
| 2009/0084272 | A1 * | 4/2009 | Chikazawa et al. | 99/330 |
| 2009/0090352 | A1 * | 4/2009 | Chikazawa et al. | 126/391.1 |

FOREIGN PATENT DOCUMENTS

| | | | | |
|---|---|---|---|---|
| EP | 1498062 A1 * | 1/2005 | | A47J 37/12 |
| JP | 9-14283 U | 10/1934 | | |
| JP | 59-44937 U | 3/1984 | | |
| JP | U-02-036711 | 3/1990 | | |
| JP | U-02-040343 | 3/1990 | | |
| JP | A-02-195105 | 8/1990 | | |
| JP | 2002081573 A * | 3/2002 | | F16K 31/44 |
| JP | 2002085268 A * | 3/2002 | | A47J 37/12 |
| JP | A-2002-223953 | 8/2002 | | |
| JP | 2002-360449 A | 12/2002 | | |
| JP | 2005034379 A * | 2/2005 | | A47J 37/12 |

OTHER PUBLICATIONS

Japanese Office Action for Application No. 2007-262487 mailed Oct. 29, 2013 (with English Translation).

Jun. 19, 2012 Office Action issued in Japanese Patent Application No. 2007-262487 (with translation).

* cited by examiner

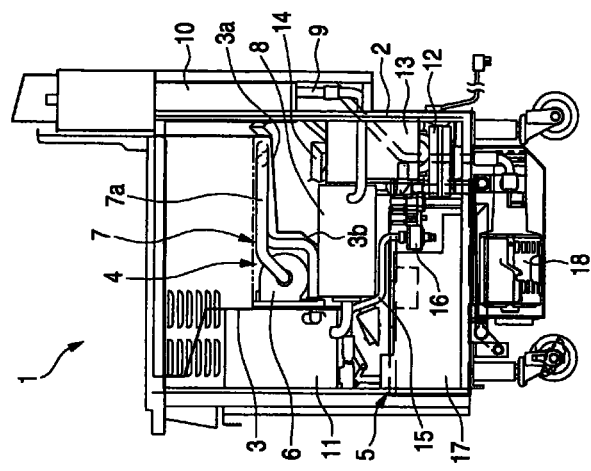
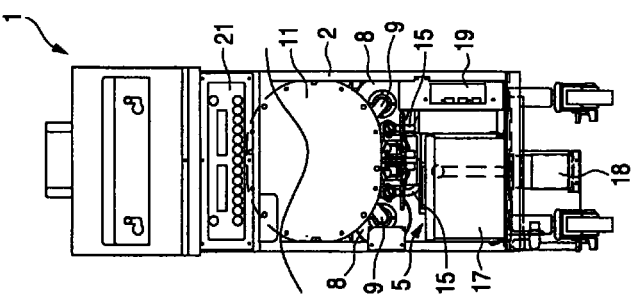

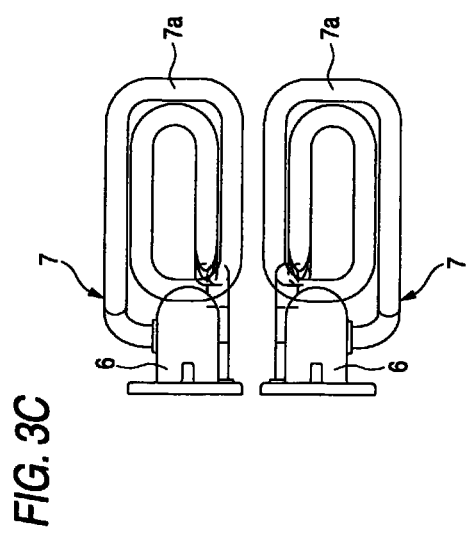
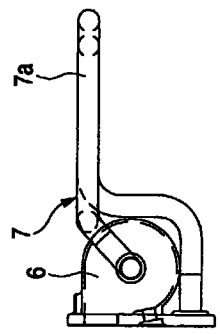
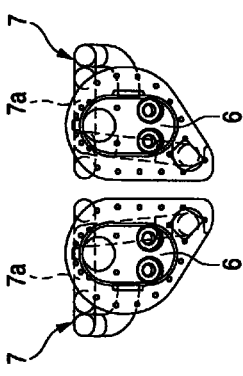
FIG. 3C
FIG. 3B
FIG. 3A

US 8,905,015 B2

PULSE BURNER AND LIQUID HEATING COOKER

CROSS-REFERENCE TO RELATED APPLICATIONS

This application is based upon and claims priority from Japanese Patent Application No. 2007-262487 filed on Oct. 5, 2007, the entire contents of which are incorporated herein by reference.

BACKGROUND OF THE INVENTION

1. Field of the Invention

The present invention relates to: a pulse burner used in a liquid heating cooker such as a fryer and configured to explode and combust mixed gas of fuel gas and combustion air and feed combustion exhaust gas into a tail pipe connected to the combustion chamber thereby to enable heat-exchange with external liquid; and a liquid heating cooker using the pulse burner as a heating unit.

2. Description of Related Art

A fryer serving as an example of a liquid heating cooker is described in JP-A-2002-223953, for example. The fryer includes, at an upper part in a housing, an oil vat for storing cooking oil therein, and a pulse burner for heating the oil stored in the oil vat. The oil stored in the oil vat is heated by the pulse burner at a predetermined temperature and thereafter foods are put into the oil vat, whereby the foods can be cooked by heating.

This pulse burner includes a combustion chamber provided in the oil vat; a tail pipe which is connected to the combustion chamber and has a heat exchange part bent and formed in the up-down and left-and-right directions in the oil vat; and a mixing chamber which communicates with the combustion chamber and to which fuel gas and combustion air are supplied. As soon as mixed gas of the fuel gas and the combustion air is fed into the combustion chamber from the mixing chamber and the mixed gas is lighted by a spark plug, explosive combustion is produced in the combustion chamber. By increase of pressure in the combustion chamber caused by its explosive combustion, combustion exhaust gas is fed into the tail pipe to be forcedly exhausted, and the fuel gas and the combustion air are inhaled into the combustion chamber put in a negative pressure state by the exhaust of this combustion exhaust gas. By performing repeatedly this operation, heat exchange with the oil coming into contact with the tail pipe is performed, thereby to heat the oil up to a cooking temperature.

SUMMARY OF THE INVENTION

In the fryer described above, at the bottom portion of the oil vat which is located below the tail pipe, an area at the deep bottom referred to as a cold zone is formed, where the temperature of the oil becomes lower than the cooking temperature. By heaping oil sediment and oil deteriorated by oxidation in the cold zone, re-attachment of them to subjects to be cooked is prevented and quality of oil in a cooking zone on the upper side is maintained. However, the formation of this cold zone causes more increase in volume of the oil vat than the oil vat needs, so that increase in amount of oil to be used and increase in gas consumption amount necessary for heating are caused, and also increase in size and weight of the fryer is caused, whereby cost becomes expensive.

Therefore, an object of an aspect of the invention is to provide a pulse burner which leads to saving of the using amount of liquid such as oil and the gas consumption amount, and by which energy saving can be expected; and a liquid heating cooker using the pulse burner.

According to an aspect of the invention, there is provided a pulse burner comprising: a combustion chamber provided in a liquid vat capable of storing liquid; a tail pipe that is connected to the combustion chamber and has a heat exchanging portion located in the liquid vat and bent in a predetermined shape; and a mixing chamber which communicates with the combustion chamber and to which fuel gas and combustion air is allowed to be supplied, wherein when mixed gas including the fuel gas and the combustion gas is exploded and combusted, the combustion exhaust gas is exhausted through the tail pipe to allow heat exchange with the liquid, and the mixed gas is inhaled from the mixing chamber into the combustion chamber, and wherein at least the heat exchanging portion of the tail pipe is bent on a substantially horizontal plane.

According to another aspect of the invention, there is provided a liquid heating cooker comprising: a housing; a liquid vat capable of storing liquid; and a heating unit configured to heat the liquid stored in the liquid vat, wherein the heating unit comprises a pulse burner comprising: a combustion chamber provided in the liquid vat; a tail pipe that is connected to the combustion chamber and has a heat exchanging portion located in the liquid vat and bent in a predetermined shape; and a mixing chamber which communicates with the combustion chamber and to which fuel gas and combustion air is allowed to be supplied, wherein when mixed gas including the fuel gas and the combustion gas is exploded and combusted, the combustion exhaust gas is exhausted through the tail pipe to allow heat exchange with the liquid, and the mixed gas is inhaled from the mixing chamber into the combustion chamber, wherein at least the heat exchanging portion of the tail pipe is bent on a substantially horizontal plane, and wherein at least a part of a bottom portion of the liquid vat extends substantially horizontal and is brought close to a lower surface of the heat exchanging portion of the tail pipe.

BRIEF DESCRIPTION OF THE DRAWINGS

FIGS. 1A and 1B are explanatory views of a fryer, in which FIG. 1A shows a front view and FIG. 1B shows a side view;

FIGS. 2A to 2D are explanatory views of an oil vat, in which FIG. 2A shows a front view, FIG. 2B shows a side view, FIG. 2C shows a bottom view and FIG. 2D shows a rear view; and FIGS. 3A to 3C are explanatory views of a pulse burner, in which FIG. 3A shows a front view, FIG. 3B shows a side view and FIG. 3C shows a bottom view.

DETAILED DESCRIPTION OF THE EMBODIMENTS

Figure 2D:
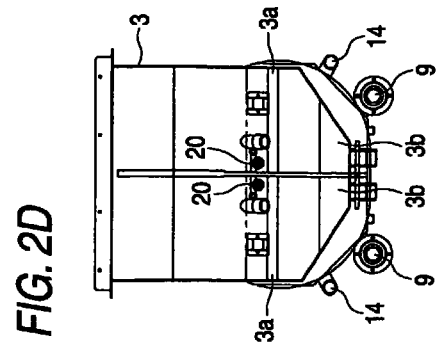

An embodiment of the invention will be described below with reference to drawings.

FIGS. 1A and 1B are explanatory views showing a fryer which is an example of a liquid heating cooker, in which FIG. 1A shows a front view and FIG. 1B shows a side view. A fryer 1 includes, in a housing 2, a pair of left and right oil vats 3 serving as a liquid vat which can store oil and partitioned in the center, a pulse burner 4 configured to heat the oil in each oil vat 3, and an oil cleaner 5 configured to filter the oil.

The pulse burner 4 includes a combustion-exhaust system including: a combustion chamber 6 provided in each oil vat 3 and configured to combust mixed gas of fuel gas and combustion air; a tail pipe 7 through which combustion gas from the combustion chamber 6 passes; a de-coupler 8, 8 connected to the downstream side of the tail pipe 7 and provided on both sides of the oil vat 3; and an exhaust duct 9 which is connected to the downstream side of the de-coupler 8, 8 and provided upright at the rear of the housing 2. Reference numeral 10 is a muffler provided midway of the exhaust duct 9.

Figure 2C:
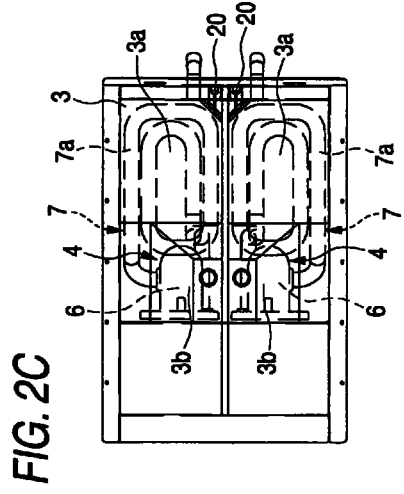
Figure 2B:
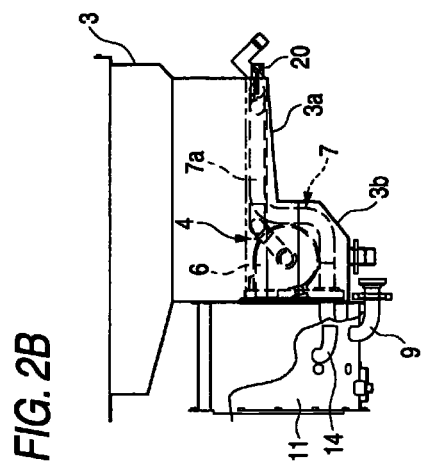
Figure 2A:
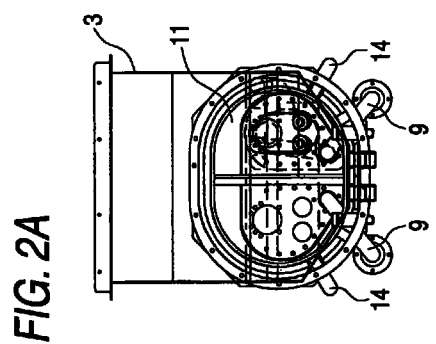

In each oil vat 3, as shown also in FIGS. 2A to 2D and FIGS. 3A to 3C, the tail pipe 7 rises upward from the side surface of the combustion chamber 6, is bent and formed spirally in the oil vat 3 on the horizontal plane near the upper surface of the combustion chamber 6 thereby to form a heat exchanging portion 7a, and thereafter is turned to the lower surface from the rear surface of the combustion chamber 6 to be connected to the exhaust duct 9 at the outside of the oil vat 3. Therefore, at the bottom portion of the oil vat 3, a rear portion 3a corresponding to the heat exchanging portion 7a of the tail pipe 7 comes close to the lower surface of the heat exchanging portion 7a and is formed in the substantially horizontal shape so as to slope slightly downward toward the front, and only a front portion 3b is protruded downward so as to surround the combustion chamber 6 portion. Namely, the heat-exchanging portion 7a of the tail pipe 7 is bent in the substantially same height to reduce the up-and-down size of the heat exchanging portion 7, whereby the oil vat 3 is formed in the raised-bottom shape and a cold zone is not provided at the bottom of the oil vat 3.

At the outside portion on the front surface of each oil vat 3, an air chamber 11 is provided. This air chamber 11 includes therein a mixing chamber (not shown) that communicates with the combustion chamber 6 through a flapper valve, and the combustion air can be supplied to the air chamber 11 from a fan 12 provided at the bottom of the housing 2 through a muffler 13 and an air supply pipe 14. Further, a gas conduit 15 connected to the mixing chamber in the air chamber 11 is provided with a local switch 16 including two electromagnetic valves for controlling opening and closing of a supply path of fuel gas to the pulse burner 4 and a gas governor for adjusting gas pressure.

The oil cleaner 5 includes an oil tank 17 and a pump 18. The oil conveyed from the oil vat 3 to the oil tank 17 is filtered by a filter provided in the oil tank 17 and thereafter returned into the oil vat 3 by the pump 18, thereby to enable oil filtering.

At the lower part on the front side of the housing 2, a burner controller 19 is provided. To this burner controller 19, the electromagnetic valves of the local switch 16 and a temperature sensor 20,20 provided in each oil vat 3 are connected, and the burner controller 19, on the basis of a temperature detecting signal from the temperature sensor 20, closes and opens the electromagnetic valves of the local switch 16 so as to keep the oil temperature in the oil vat 3 at a cooking temperature (for example, 180° C. to 182° C.) thereby to enable execution of ON/OFF control which performs intermittently the combustion of air-fuel mixture in the combustion chamber 6. At the upper part on the front side of the housing 2, a fry controller 21 is provided which includes operation buttons and a display portion, and sets a cooking mode, a temperature keeping mode and a cooking temperature to input instructions to the burner controller 19.

In the fryer 1, when the oil vat 3 is filled with oil, the predetermined cooking mode is selected by the fry controller 21, and an operation switch is tuned on, the burner controller 19 rotates the fan 12 for a predetermined time to supply air, and thereafter combusts intermittently the mixed gas in the combustion chamber 6 to operate the pulse burner 4. Namely, the pulse burner 4 operates repeatedly the operation of igniting the mixed gas with a spark plug (not shown) provided in the combustion chamber 6 to explode and combust the mixed gas in the combustion chamber 6, and exhausting forcedly the combustion exhaust gas to the tail pipe 7 by increase in pressure in the combustion chamber 6 which is caused by its combustion; and the operation of inhaling the fuel gas and the combustion air into the combustion chamber 6 which is put in the negative pressure state due to the exhaust of the combustion exhaust gas. By this ON/OFF operation of this pulse burner 4, the exchange of heat is performed between the heat exchanging portion 7a of the tail pipe 7 and the oil in the oil vat 3, and the oil is heated to the cooking temperature. Accordingly, as soon as the foods are input into the oil vat 3 through a basket, they are heated and cooked by the oil of the high temperature. The combustion exhaust gas which has passed through the tail pipe 7 is exhausted upward from the exhaust duct 9 through the de-coupler 8.

Since the oil vat 3 is formed in the raised-bottom shape by the rear portion 3a, the oil using amount decreases (to about ⅔ compared with the case where the cold zone is provided), which leads to saving of the fuel gas. Particularly, in case where the temperature keeping control is performed during cooking by heating, since the heat-radiating amount of oil is also reduced, energy necessary to keep the temperature is also saved. Further, since all the oil is utilized for cooking, the amount of oxidized oil also decreases, so that the life of oil can be lengthened.

Further, even in case where the cold zone is not provided, as long as the oil sediment and the oil deteriorated by oxidation are removed by periodical filtering by means of the oil cleaner 5, quality of the oil can be maintained.

Thus, according to the pulse burner 4 and the fryer 1 in the above embodiment, the heat exchanging portion 7a of the tail pipe 7 is bent and formed on the substantially horizontal plane, and the rear portion 3a of the oil vat 3 is formed in the substantially horizontal shape so as to come close to the lower surface of the heat exchanging portion 7a of the tail pipe 7, whereby the volume of the oil vat 3 can be reduced. Therefore, this reduction leads to saving of the oil using amount and the gas consumption amount, so that energy saving can be expected. Further, since the space in the housing 2 occupied by the oil vat 3 is reduced, size-reduction and weight reduction of the apparatus can be realized, and the invention is more advantage in cost so that a component such as a caster or the like can use an inexpensive one.

The bending shape of the heat exchanging portion of the tail pipe is not limited to the above shape. As long as the heat exchanging portion is located on the horizontal plane, the specific shape of the heat exchanging portion can be appropriately changed. However, as described before, the plane does not need to be strictly horizontal. Since the embodiment intends that up-and-down size of the heat exchanging portion is reduced and the liquid vat is formed in the raised-bottom shape, slight inclination and unevenness can be permissible.

Similarly, regarding the bottom portion of the oil vat, the portion corresponding to the heat exchanging portion is not be slightly inclined but may be horizontal. Further, as described in the above embodiment, a part of the bottom portion of the oil vat may be made substantially horizontal, or the entirety of the bottom portion may be made substantially horizontal according to the connecting form between the combustion chamber and the tail pipe.

Further, the fryer is not limited to the type having a pair of oil vats, but may be a type having a single oil vat, or a pressure fryer which applies pressure by sealing the oil vat by a lid body. Further, the invention can be applied to not only the fryer but also another liquid heating cooker such as a noodle boiler which cooks noodles with water boiled at a high temperature.

What is claimed is:

1. A pulse burner comprising:
   a combustion chamber provided in a liquid vat;
   a tail pipe that is connected to the combustion chamber and has a heat exchanging portion located in the liquid vat and bent in a predetermined shape; and
   a mixing chamber which communicates with the combustion chamber and to which fuel gas and combustion air are allowed to be supplied,
   wherein when mixed gas including the fuel gas and the combustion gas is exploded and combusted in the pulse burner, the combustion exhaust gas is exhausted through the tail pipe to allow heat exchange with the liquid, and the mixed gas is inhaled from the mixing chamber into the combustion chamber,
   wherein at least the heat exchanging portion of the tail pipe is bent and formed along a single plane that is substantially horizontal and at least a part of a bottom portion of the liquid vat extends substantially horizontal and is brought close to a lower surface of the heat exchanging portion of the tail pipe, and
   wherein a front portion of the heat exchanging portion extends downwardly to form a recess and to surround the combustion chamber.

2. The pulse burner according to claim 1, wherein the tail pipe has a first end connected to the combustion chamber and a second end opposite to the first end and connected to an outside of the liquid vat.

3. The pulse burner according to claim 2, wherein the heat exchange portion is located above the second end.

4. The pulse burner according to claim 3, wherein the second end is located below the combustion chamber.

5. The pulse burner according to claim 4, wherein at least a part of the tail pipe defined between the heat exchange portion and the second end is located under the combustion chamber.

6. The pulse burner according to claim 2, wherein the heat exchange portion is located above the first end.

7. The pulse burner according to claim 1,
   wherein at least the heat exchanging portion of the tail pipe is bent to form a spiral shape as viewed from above.

8. A liquid heating cooker comprising:
   a housing;
   a liquid vat; and
   a heating unit configured to heat the liquid stored in the liquid vat,
   wherein the heating unit comprises a pulse burner comprising:
   a combustion chamber provided in the liquid vat;
   a tail pipe that is connected to the combustion chamber and has a heat exchanging portion located in the liquid vat and bent in a predetermined shape; and
   a mixing chamber which communicates with the combustion chamber and to which fuel gas and combustion air are allowed to be supplied,
   wherein when mixed gas including the fuel gas and the combustion gas is exploded and combusted, the combustion exhaust gas is exhausted through the tail pipe to allow heat exchange with the liquid, and the mixed gas is inhaled from the mixing chamber into the combustion chamber,
   wherein at least the heat exchanging portion of the tail pipe is bent and formed along a single plane that is substantially horizontal,
   wherein at least a part of a bottom portion of the liquid vat extends substantially horizontal and is brought close to a lower surface of the heat exchanging portion of the tail pipe, and
   wherein a front portion of the heat exchanging portion extends downwardly to form a recess and to surround the combustion chamber.

* * * * *